United States Patent [19]
Woods

[11] 3,965,579
[45] June 29, 1976

[54] MEASURING TAPE ANCHOR

[76] Inventor: Lee W. Woods, 113 California, NE., Albuquerque, N. Mex. 87108

[22] Filed: May 19, 1975

[21] Appl. No.: 578,905

[52] U.S. Cl. ............................................. 33/137 R
[51] Int. Cl.² ........................................... G01B 3/10
[58] Field of Search ........................... 33/137 R, 138

[56] References Cited
UNITED STATES PATENTS

| | | | |
|---|---|---|---|
| 1,006,056 | 10/1911 | Bowers | 33/137 R |
| 1,066,972 | 7/1913 | Aitken | 33/137 R |
| 1,303,756 | 1/1918 | Ballou | 33/137 R |
| 1,506,295 | 8/1924 | Forder | 33/137 R |
| 1,860,635 | 5/1932 | Thompson | 33/137 R |
| 3,281,943 | 11/1966 | Maksim | 33/138 |

*Primary Examiner*—Richard E. Aegeter
*Assistant Examiner*—Steven L. Stephan
*Attorney, Agent, or Firm*—Clarence A. O'Brien; Harvey B. Jacobson

[57] ABSTRACT

A tape rule of the type including a hollow housing having a slot formed through one peripheral edge portion of the housing and including a coiled flexible measuring tape within the housing having one end thereof projectable and retractable through the slot is provided and a generally L-shaped anchor member including a pair of generally right-angularly disposed arms is also provided. The arms of the L-shaped anchor member are rigidly interconnected at adjacent ends and structure is provided for pivotally attaching the terminal end of the free end of the tape to the anchor member for oscillation of the latter relative to the terminal end about an axis disposed transverse to the free end of the tape and generally mutually perpendicular to the arms of the anchor member. The free end of one of the arms of the anchor member includes an angularly directed terminal end projecting into the included angle formed by the arms and the free end of the right-angularly disposed terminal end is toothed for gripping one side of a structure having an adjacent side along which the free end portion of the tape extends. In this manner the free end of the tape may be hooked about the corner of a structure in order to measure an adjacent side of the structure. Further, by having the L-shaped anchor member pivotally attached to the free terminal end of the tape for oscillation relative thereto the L-shaped anchor member may be positioned so as to embrace those peripheral side portions of the housing of the tape rule on either side of the slot formed in the housing through which the measuring tape is extendable and protractible. By this manner of storing the L-shaped anchor member when the associated measuring tape is not in use compact storage of the combination consisting of the tape rule and the L-shaped anchor member is assured.

2 Claims, 4 Drawing Figures

MEASURING TAPE ANCHOR

BACKGROUND OF THE INVENTION

Various forms of anchor members have been heretofore provided for the free end of a flexible tape strip. However, the substantially L-shaped configuration of the anchor member portion of the instant invention and its ability to embracingly engage the associated tape housing when the tape is not in use has not been used previously.

Examples of tape structures including free end anchor members including some of the structural features of the instant invention are disclosed in U.S. Pat. Nos. 1,029,767, 1,066,972, 2,466,405, 2,778,118, 3,281,493 and 3,473,235.

BRIEF DESCRIPTION OF THE INVENTION

The measuring tape anchor of the instant invention is constructed in a manner whereby it may be readily hooked around a corner of an object having one adjacent side to be measured and the anchor further includes structure whereby the associated flexible tape will be held tight against the side of a structure being measured and in a manner substantially eliminating any possibility of obliteration of the measuring indicia on the tape as a result of firm contact between the tape and the anchor.

Further, the anchor member portion is constructed so as to be generally L-shaped in configuration and positionable so as to embracingly engage the housing of the associated tape when the tape is not being used.

Also, the anchor member is pivotally attached to the free terminal end of the associated tape whereby the anchor member may be used in conjunction with variously shaped articles to be measured.

The main object of this invention is to provide a tape anchor for a flexible measuring tape to enable the free end of the measuring tape to be suitably anchored around a corner of an object having a side thereof adjacent the corner to be measured.

Another object of this invention, in accordance with the immediately preceding object, is to provide an anchor member including means by which considerable frictional engagement of the anchor with the object to be measured may be accomplished.

Yet another important object of this invention is to provide an anchor for a measuring tape constructed in a manner whereby the tape will be firmly pressed against an object being measured through the utilization of the anchor member.

A final object of this invention to be specifically enumerated herein is to provide a measuring tape anchor in accordance with the preceding objects and which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

DETAILED DESCRIPTION OF THE INVENTION

Figure 1:
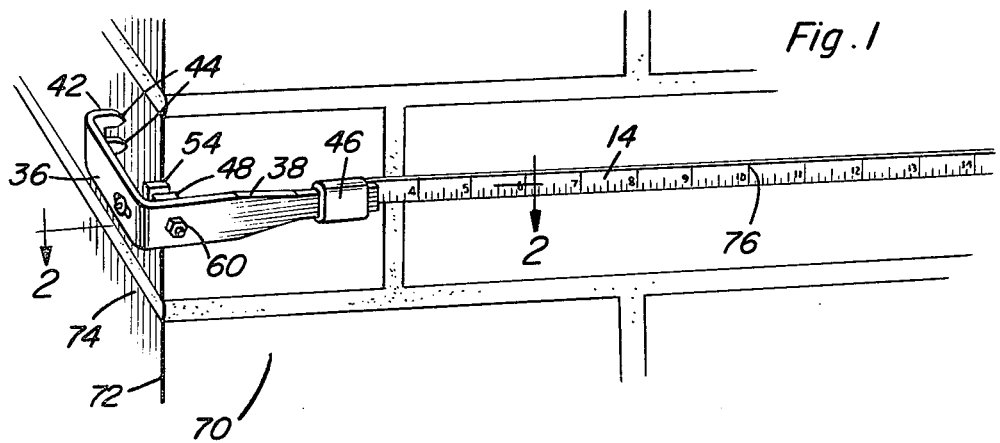
FIG. 1 is a fragmentary perspective view of a brick structure with the measuring tape anchor of the instant invention operatively associated with one corner portion of the brick structure and an adjacent free terminal end of an associated measuring tape operatively connected to the anchor.

Referring now more specifically to the drawings, the numeral 10 generally designates a conventional form of measuring tape rule construction including a cylindrical housing 12 having an entrance slot 13 formed in one peripheral portion. The housing 12 is hollow and has an elongated coiled flexible measuring tape 14 disposed therein. The measuring tape 14 includes a free end 16 to which a ring-type terminal end member 18 is secured. The terminal end member 18 is in the form of a generally rectangular ring including opposite longitudinal sides 20 and 22 and opposite end transverse portions 24 and 26. The ring-shaped terminal end member 18 has its transverse end member 24 pivotally attached to the free end 16 of the tape 14 by means of a pivot mount 28 and the terminal end member 18 may have an apertured flange member 30 pivotally attached to the end member 26 thereof.

The anchor member of the instant invention is referred to in general by the reference numeral 32 and includes a generally L-shaped bracket 34 including a pair of right-angularly disposed arms 36 and 38 joined at adjacent ends by means of an integral curved corner portion 40. The free end of the arm 36 includes a right-angularly disposed terminal end portion 42 whose free end is toothed as at 44. Further, the free end of the arm 38 is encircled by a resilient band 46 for a purpose to be hereinafter more fully set forth.

An abutment flange 48 is rigidly secured to the inner side of the base end of the arm 38 in any convenient manner and the flange 48 is provided with a smooth bore 50 therethrough registered with a second smooth bore 52 formed through the arm 38. A second flange in the form of a clamping flange 54 is provided inward of the abutment flange 48 and the clamping flange 54 also includes a smooth bore 56 formed therethrough. A threaded type fastener 58 is secured through the bores 50, 52 and 56 by means of a threaded nut 60 and the ring-shaped terminal end member 18 is clamped between the abutment flange 48 and the clamp flange 54.

Figure 2:
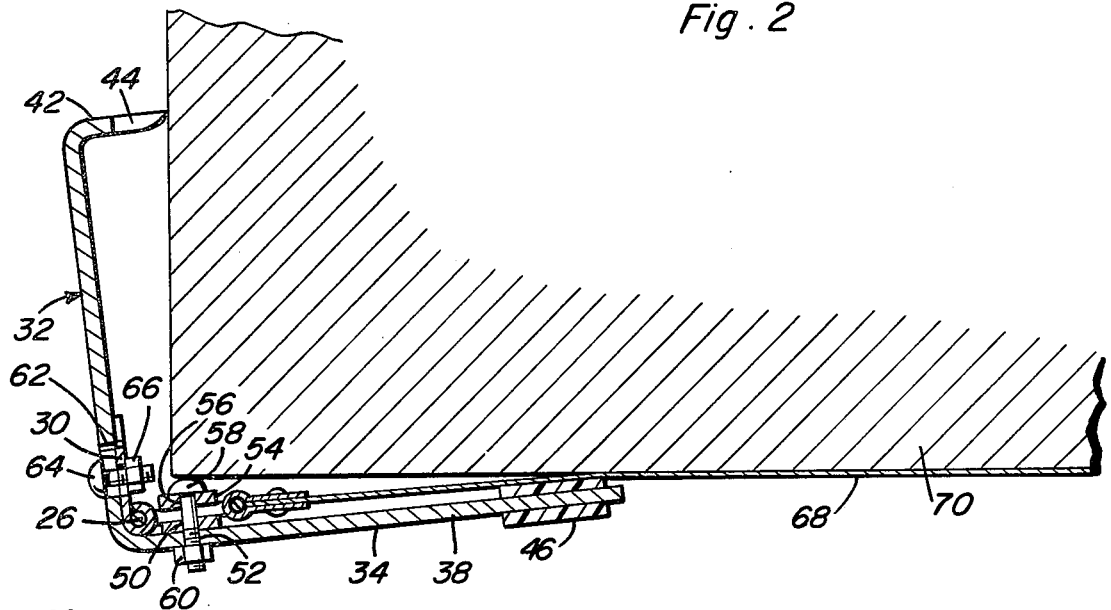
FIG. 2 is an enlarged fragmentary horizontal sectional view taken substantially upon the plane indicated by the section line 2—2 of FIG. 1.
Figure 3:
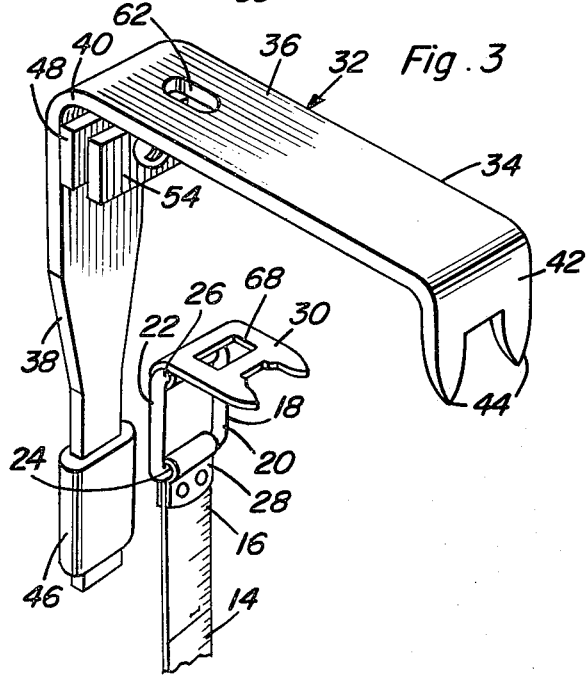
FIG. 3 is a perspective view of the measuring tape anchor and the adjacent end of a conventional measuring tape, the measuring tape being in exploded position relative to the anchor.

With attention now invited more specifically to FIGS. 2 and 3 of the drawings it will be seen that the base end of the arm 36 has a slot 62 formed therethrough and a threaded fastener 64 is secured through the slot 62 by means of a nut 66. The fastener 64 also extends through the central aperture 68 formed in the flange member 30. Accordingly, the free end of the measuring tape 14 is secured to the anchor member 32 by means of the two fasteners 58 and 64.

In operation, if it is desired to measure one side 68 of a building structure 70, the anchor member 32 may be engaged with the corner 72 of the structure 70 with the arm 36 overlying the adjacent side 74 of the structure 70 and the teeth 44 frictionally engaged with the side 74. Then, the tape member 14 may be extended along the side 68 with the resilient sleeve 46 clamping the free end of the tape member 68 between the free end of the arm 38 and the side 68 of the structure 70. The resilient sleeve or sleeve member 46 prevents the measuring indicia 76 on the tape member 68 from being obliterated through continued use by the free end of the arm 38.

Figure 4:
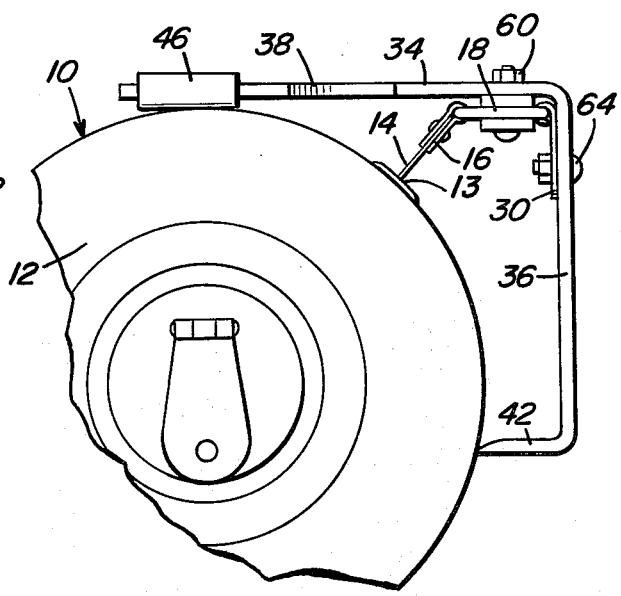
FIG. 4 is a fragmentary plan view of a conventional form of flexible tape measure with the measuring tape portion thereof in a substantially fully retracted position and with the anchor member of the instant invention operatively associated with the flexible tape portion and housing portion of the measuring tape.

When the tape member 14 is substantially fully retracted within the housing 12, the L-shaped anchor member 32 may be positioned so as to snugly embrace approximately one-quarter of the external periphery of the housing 12 through which the entrance slot 13, is formed, see FIG. 4.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. In combination with a conventional tape rule of the type including a generally circular housing having a slot formed through one peripheral edge portion and a coiled flexible measuring tape within said housing provided with one free end portion protractible and retractable through said slot, a generally rectangular ring-type terminal end member pivotally mounted on said free end of said tape, and a right angularly extending apertured flange supported from and projecting outwardly of one side of the outer end of said end member; a rigid generally L-shaped anchor member including a pair of generally right-angularly disposed arms rigidly interconnected at adjacent ends, and means removably clampingly attaching said terminal end member to the inner side of one of said adjacent ends and said flange to the inner side of the other of said adjacent ends with said terminal end and flange generally paralleling the corresponding adjacent ends of said arms, said terminal end member being pivotally attached to the free end of the tape for oscillation relative thereto about an axis generally paralleling one side of said end member and extending transversely of said tape, the free end portion of one of said arms including an angularly directed terminal end projecting into the included angle formed by said arms, at least the inner side of the free end portion of the other of said arms including a resilient bumper portion, the length of said arms of said anchor member being such to enable the latter, when said tape is substantially fully retracted within said housing, to be positioned against said housing embracing approximately one-quarter of the external periphery thereof and with the juncture between said arms spaced outwardly of said slot.

2. The combination of claim 1 wherein said resilient bumper portion comprises a resilient band transversely encircling the free end portion of said other of said arms.

* * * * *